Nov. 18, 1969          P. L. BREON ETAL                3,478,833
                POWER MODULE FOR A SECTIONALIZED VEHICLE
Filed Nov. 13, 1967                              2 Sheets-Sheet 1
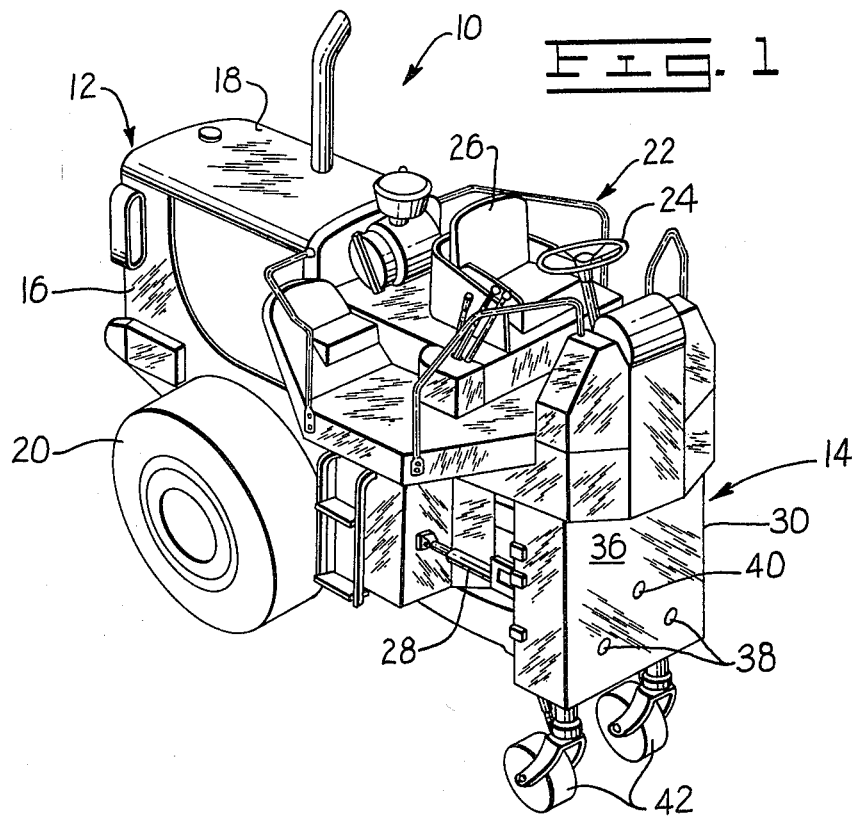
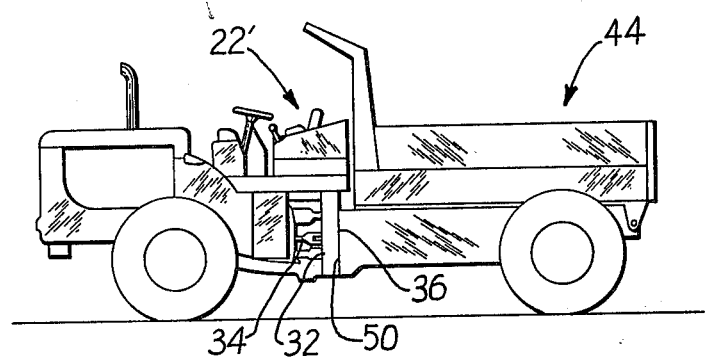
INVENTORS
PEARL L. BREON
VERNON W. IMES
HAROLD R. JOHNSON
JAMES M. NUTTER
BY
ATTORNEYS Nov. 18, 1969     P. L. BREON ET AL     3,478,833

POWER MODULE FOR A SECTIONALIZED VEHICLE

Filed Nov. 13, 1967     2 Sheets-Sheet 2

INVENTORS
PEARL L. BREON
VERNON W. IMES
HAROLD R. JOHNSON
JAMES M. NUTTER

BY

ATTORNEYS

United States Patent Office 3,478,833
Patented Nov. 18, 1969

3,478,833
POWER MODULE FOR A SECTIONALIZED VEHICLE
Pearl L. Breon, Vernon W. Imes, and Harold R. Johnson, Peoria, and James M. Nutter, Washington, Ill., assignors to Caterpillar Tractor Co., Peoria, Ill., a corporation of California
Filed Nov. 13, 1967, Ser. No. 682,475
Int. Cl. B60k 29/00; B60d 1/00
U.S. Cl. 180—12    3 Claims

ABSTRACT OF THE DISCLOSURE

A power module for a sectionalized vehicle and having a wheeled driving section provided with a hydraulically operated steering mechanism, a wheeled steering section being secured to the driving section by an articulated joint, the steering section being connected to the steering mechanism for steering of the power module, the steering section presenting a surface for attachment to a wheeled work tool.

---

Power modules for sectionalized vehicles are known and usually take the form of a tractor which is releasably connected by an articulated joint to a wheeled work tool such as an earthmover. Steering of the assembled vehicle is accomplished by means of a hydraulic steering mechanism including steering jacks operative to vary the angular position of the work tool.

The known power modules usually have only two wheels, and are therefore unstable when disassembled from a work tool and assembly and disassembly operations are consequently relatively complex and time-consuming.

The present invention provides a power module which overcomes the above discussed disadvantages of the prior art. The advantages of the present invention will become apparent to one skilled in the art, from the following description, when read in conjunction with the accompanying drawings, in which:

FIGURE 1 is a perspective view of a power module constructed in accordance with the invention;

FIGURE 2 is a side-elevational view of the power module of FIGURE 1 being shown connected to a truck;

Figure 3:
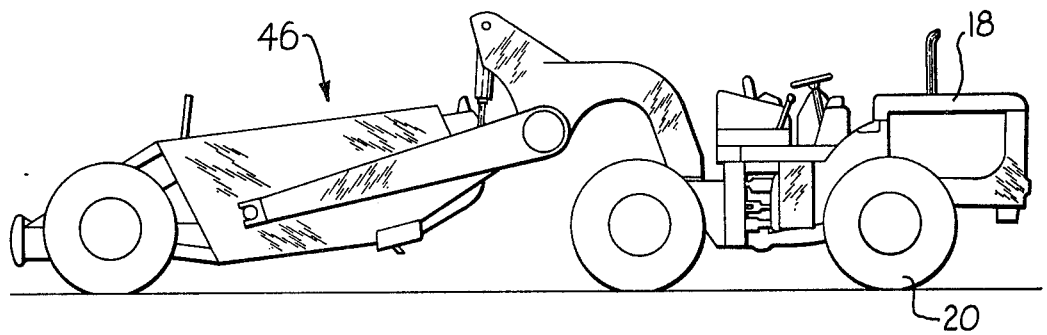
FIGURE 3 is a view similar to FIGURE 2, the connection of the power module being to a scraper.

In FIG. 1, there is shown a power module 10 for a sectionalized vehicle the model embodying a driving section 12 and a steering section 14. The driving section 12 includes an engine enclosure 18 and two drive wheels, one shown at 20.

Supported by the frame 16 is an operator's station 22 which includes a steering wheel 24 and a seat 26. The steering wheel 24 serves to control a conventional hydraulic steering mechanism mounted beneath the station 22 and which includes a pair of steering jacks, one shown at 28. The station 22 can be lifted out of position and replaced by an oppositely-directed station 22' such as seen in FIG. 2. If so desired, it is possible to provide a rotatable operator's station.

The steering section 14 provides a panel 30 which is normally vertically disposed, and which is connected at its inner surface 32 to the frame 16 by means of a conventional articulated joint 34 (FIG. 2). The panel 30 is formed with tapped holes 38 for receiving bolts and with a central alignment pocket 40.

Mounted at the bottom of the panel 30 are a pair of non-swivelling dolly wheels 42. These wheels are vertically adjustable by suitable jacks, not shown, and can be withdrawn upwardly into the steering section.

Figure 4:
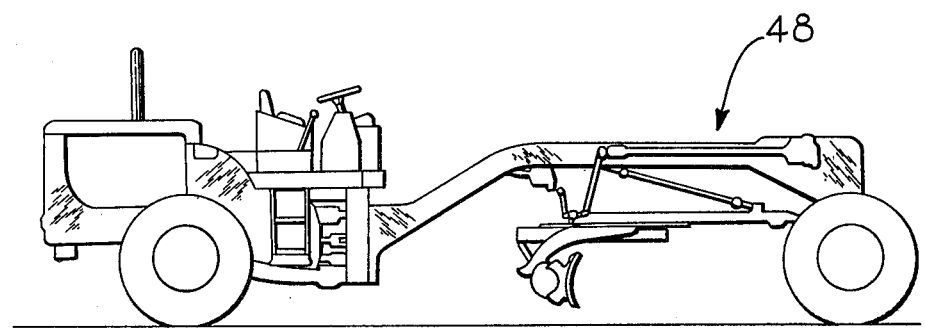
FIGURE 4 is a view similar to FIGURE 2, the connection of the power module being to a motor grader.

The power module 10 may be connected to a truck 44 shown in FIG. 2, a scraper 46 shown in FIG. 3, a motor grader 48 shown in FIG. 4; or to any of a number of other conventional work tools. When it is desired to make such a connection, the power module may be driven in conventional manner to the location of the work tool, with either of the stations 22, 22' being employed, and with the wheels 42 being in their lowered position shown in FIG. 1. The panel 30 together with the wheels 42 may be turned for steering purposes by means of the hydraulic steering jacks 28.

The connection of the power module to the work tool is made by means of bolts or pins received in the holes 38. The pocket 40 receives a bolt or pin for alignment purposes. During the alignment process, the wheels 42 may be raised or lowered to provide the correct vertical alignment, while the steering jacks 28 may be actuated to provide the correct lateral alignment.

After the power module 10 has been connected to the work tool the wheels 42 may be raised into inoperative position, and the assembled work vehicle driven in conventional manner.

When it is desired to disconnect the power module 10 from the work tool, the wheels 42 may be again lowered to the position shown in FIG. 1, and the disconnection then effected.

One advantage of the invention is the stability produced by the wheels 42, when the module 10 is disconnected from the work tool. Another advantage is the ease of steerability provided by the hydraulic steering mechanism. A further advantage is the ease of connection of the module 10 to the work tool resulting from the relatively few bolts or pins required at the surface 36.

We claim:
1. A power module for a sectionalized vehicle, said module comprising:
   (a) a wheeled driving section provided with a steering mechanism; and
   (b) a wheeled steering section secured to said driving section by an articulated joint, said steering section being connected to said steering mechanism for steering of said power module, said steering section being adapted for attachment to a wheeled work tool, said steering section also providing a panel adapted for vertical disposition and having one side surface adapted for connection to said driving section, and an opposite side surface adapted for attachment to a work tool.

2. A power module in accordance with claim 1, in which said steering mechanism provides hydraulically operated jacks connected to said one side surface.

3. A power module in accordance with claim 1, in which a plurality of vertically adjustable wheels are mounted at the base of said panel.

References Cited

UNITED STATES PATENTS

| 2,594,695 | 4/1952 | Storey | 180—79.2 |
|---|---|---|---|
| 2,928,683 | 3/1960 | Rockwell | 180—12 X |
| 3,223,193 | 12/1965 | Reynolds et al. | 180—77 |
| 3,315,758 | 4/1967 | Allen | 180—77 |
| 3,326,312 | 6/1967 | Buller | 280—43.23 |
| 3,334,702 | 8/1967 | Granryd | 180—11 X |

KENNETH H. BETTS, Primary Examiner

U.S. Cl. X.R.
180—14, 77; 280—43.23